R. WHITE.
Breech-Loading Fire-Arm.
No. 2,236. Reissued May 1, 1866.
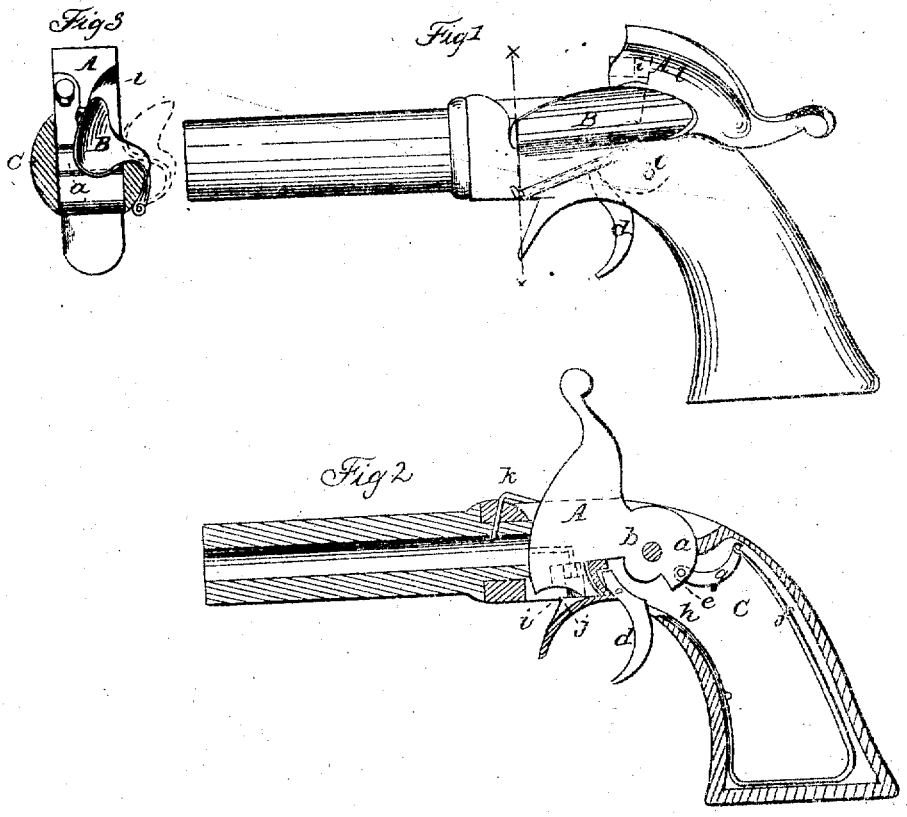

BEST AVAILABLE COPY

UNITED STATES PATENT OFFICE.

ROLLIN WHITE, OF LOWELL, MASSACHUSETTS.

IMPROVEMENT IN BREECH-LOADING FIRE-ARMS.

Specification forming part of Letters Patent No. 12,638, dated April 3, 1855; Reissue No. 2,236, dated May 1, 1866.

*To all whom it may concern.*

Be it known that I, ROLLIN WHITE, of Lowell, in the State of Massachusetts, have invented a new and useful Improvement in Fire-Arms; and I do hereby declare that the following is a full, clear, and exact description thereof, reference being had to the accompanying drawings, making part of this specification, in which—

Figure 1 is a side elevation; Fig. 2 a longitudinal section, and Fig. 3 a cross-section taken in the plane of the line *x x* of Fig. 1.

The same letters indicate like parts in all the figures.

The first part of my said invention relates to a method of closing the rear end of the barrel in breech-loading fire-arms; and this part of my said invention consists of a movable breech which is part of or is so attached to the tumblers and hammer as to move with them and on the same axis to close the rear end of the barrel and inclose the charge in the act of firing it; and the second part of my said invention relates to means for facilitating the introduction of the cartridge and for holding it in place until the trigger is pulled to fire the charge; and it consists of a plate hinged to the side of the arm and formed with a recess to hold the cartridge preparatory to its being introduced into the barrel, and which is held by the tension of a spring to prevent the cartridge from dropping out of the barrel while the hammer is at full-cock, and before the trigger is pulled to fire the charge, but which, when the trigger is pulled, is moved laterally out of the way by the movable breech as it descends with the hammer to inclose the charge in the act of firing; and the third part of said invention relates to firing the charge; and it consists of an opening or aperture into the chamber, forward of the rear end thereof, in combination with the hammer (or its equivalent) adapted to strike through or come in contact with the cartridge to fire the charge by striking the cartridge forward of the rear end thereof.

A is the hinged breech, which is made all in one piece with the tumbler *a*, and works on the fulcrum-pin *b* of the tumbler and the hammer. The breech fits into a breech-supporter in the stock or lock-frame. The trigger *d* holds and liberates the sear of the tumbler, which is actuated by the mainspring *f*, which connects with the tumbler through a link, *g*. The trigger-spring *h* actuates the trigger in the usual way. There is a plate, B, hinged to one side of the stock C, and made of such form as to serve as a seat upon which to place the cartridge before pushing it into the rear end of the chamber. This plate may be pushed inward by the tension of a spring, or it may be sufficiently elastic to yield, when pushed laterally, by the descent of the breech, and when the breech is raised to be pressed down by the cartridge with the fingers in loading far enough to enable the cartridge to be pushed from it by the fingers into the chamber, but so as to cause it, when the cartridge is in the chamber and the fingers are removed, to stand across the rear of the chamber, as shown in black outline in Fig. 3, and thus prevent the cartridge falling out at the rear of the chamber before it is fired. The breech is chamfered out on one side as shown at *l* in Figs. 1 and 3, and the plate B is so formed that the breech in falling, when liberated by the trigger, will push it aside, as shown in red outline in Fig. 3.

In fire-arms constructed on this plan, the breech is drawn up and back and cocked in the same way as the hammer of ordinary fire-arms, and when the trigger is drawn it is driven into its place to close the rear of the chamber by the mainspring, the charge being exploded after the breech has reached its place.

The hammer for firing the charge is a projection, *k*, which strikes through an aperture into the chamber and against the cartridge therein at a point between the rear and the front end thereof, the cartridge being provided in some suitable manner with fulminate priming, which needs not to be described, as that makes no part of my invention.

If desired, the first part of my invention may be used without the last part, by providing the under part of the movable breech with a nipple to receive a percussion-cap, the nipple having a vent passing through the breech to communicate fire to the charge, as represented by dotted lines in Fig. 2. When the breech is forced down by the mainspring, the cap on the nipple strikes on a part of the lock-frame as on an anvil; but I prefer the mode of firing which constitutes the third part of my invention, as by that means the charge can be fired at any part of its length between the two ends.

What I claim as my invention, and desire to secure by Letters Patent, is—

1. The movable breech, connected with and operating with the tumbler and hammer, and on the same fulcrum-pin, substantially as herein described.

2. The plate, applied substantially as described, to serve as a guide to conduct the cartridge into the open chamber, and as a guard to prevent the cartridge falling out at the rear of the chamber before the breech is liberated, as herein set forth.

3. Making an aperture into the chamber, and constructing the hammer or its equivalent so that it will ignite the charge by striking the cartridge in front of the rear end thereof, substantially as and for the purpose specified

ROLLIN WHITE.

Witnesses:

ANDREW F. JEWETT,

TAPPAN WENTWORTH.